United States Patent
Osswald

(10) Patent No.: US 8,648,563 B2
(45) Date of Patent: Feb. 11, 2014

(54) CHARGER FOR CHARGING AT LEAST ONE RECHARGEABLE ENERGY STORAGE UNIT

(75) Inventor: Alexander Osswald, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 264 days.

(21) Appl. No.: 12/741,120

(22) PCT Filed: Sep. 12, 2008

(86) PCT No.: PCT/EP2008/062124
§ 371 (c)(1),
(2), (4) Date: May 3, 2010

(87) PCT Pub. No.: WO2009/056383
PCT Pub. Date: May 7, 2009

(65) Prior Publication Data
US 2010/0237826 A1    Sep. 23, 2010

(30) Foreign Application Priority Data
Nov. 2, 2007  (DE) .......................... 10 2007 052 293

(51) Int. Cl.
*H02J 7/00*  (2006.01)
*H02J 7/04*  (2006.01)

(52) U.S. Cl.
USPC ............................ 320/107; 320/134; 320/162

(58) Field of Classification Search
USPC ....................................................... 320/107
See application file for complete search history.

(56) References Cited

U.S. PATENT DOCUMENTS

| | | | |
|---|---|---|---|
| 5,557,192 A * | 9/1996 | Tamai | 320/164 |
| 5,656,920 A | 8/1997 | Cherng et al. | |
| 5,670,862 A * | 9/1997 | Lewyn | 320/149 |
| 5,903,136 A | 5/1999 | Takahashi et al. | |
| 6,833,683 B2 * | 12/2004 | Winkler | 320/109 |
| 2002/0161537 A1 * | 10/2002 | Odaohhara | 702/63 |
| 2007/0035278 A1 * | 2/2007 | Mullett et al. | 320/130 |
| 2007/0290655 A1 * | 12/2007 | Nate et al. | 320/163 |
| 2008/0094034 A1 * | 4/2008 | Takahashi et al. | 320/134 |
| 2010/0033138 A1 * | 2/2010 | Alger et al. | 320/153 |
| 2010/0327806 A1 * | 12/2010 | Brisebois | 320/116 |

FOREIGN PATENT DOCUMENTS

| | | |
|---|---|---|
| DE | 4431620 | 3/1995 |
| EP | 0723326 A2 | 7/1996 |
| EP | 0795946 A1 | 9/1997 |

* cited by examiner

*Primary Examiner* — Drew A Dunn
*Assistant Examiner* — Nathaniel Pelton
(74) *Attorney, Agent, or Firm* — Kenyon & Kenyon LLP

(57) ABSTRACT

The invention relates to a charging device for charging at least one rechargeable energy storage unit, having a defined inner resistance and having a compensation circuit for the compensation of a voltage drop during the charging operation caused by the inner resistance. The compensation circuit has a current detection for detecting a charge current of the rechargeable energy storage unit and a voltage regulator for adjusting the charge voltage to the detected charge current. The charging device is characterized in that the compensation circuit has a voltage distributor between the current detector and the voltage regulator, by the dimensioning of which the compensation of the inner resistance is carried out.

10 Claims, 2 Drawing Sheets

CHARGER FOR CHARGING AT LEAST ONE RECHARGEABLE ENERGY STORAGE UNIT

CROSS-REFERENCE TO RELATED APPLICATION

This application is a 35 USC 371 application of PCT/EP2008/062124 filed on Sep. 12, 2008.

BACKGROUND OF THE INVENTION

1. Field of the Invention

The invention relates to a charger for charging at least one rechargeable energy storage unit.

2. Description of the Prior Art

In chargers, which for charging rechargeable energy storage units, such as rechargeable lithium-ion, nickel-cadmium, nickel-hydride or lead batteries, employ a fixed charge termination voltage, the internal resistance of the charger results in a voltage drop that is dependent on the charging current. This voltage drop causes a lengthening of the charging time and consequently affects the fill level of the rechargeable energy storage unit.

It is known to monitor the charging operation and shorten it by means of a conventional four-point measurement. However, the rechargeable energy storage unit is then permanently connected to the charger, so that a slight current flows via the measuring terminals and leads to discharging. One option for circumventing this problem is the use of a switchover device, which is capable of disconnecting the measurement connections from the rechargeable energy storage unit. However, such a switchover device is as a rule expensive and requires a relatively large amount of space.

From German Patent Disclosure DE 44 31 620 A1, a charger for rechargeable energy storage units with a maximum charging voltage of 4.2 V is known. The charger includes a compensation circuit, which compensates for at least the voltage drop that is caused by the internal resistance of the charger, with the exception of the rechargeable energy storage unit. For that purpose, a compensation resistor is integrated as a shunt with the ground line of the charger, and its resistance is equivalent to the internal resistance of the charger. A voltage detection circuit measures the charging voltage at the contacts of the wiring, including of the rechargeable energy storage unit, and a charge control circuit controls the charging operation on the basis of the measured charging voltage in such a way that the charging voltage of the rechargeable energy storage unit does not exceed a prescribed voltage. The magnitude of the charging current is fixed via a further shunt in the power supply line of the rechargeable energy storage unit.

In European Patent Disclosure EP 0 795 946 A2, a charger for accelerated charging of lithium-ion cells is also shown, which compensates for the internal series resistance (Electrical Series Resistance or ESR) during the charging operation, which results from the battery terminals, the fuses, the contacts, and the cabling, by means of a suitable compensation circuit, such that the compensation circuit subtracts the voltage drop, generated by the ESR, from the charging voltage contacting the terminals of the rechargeable energy storage unit. To that end, a shunt with a value corresponding to the ESR is disposed between the positive terminal of the rechargeable energy storage unit and the positive supply terminal of a current source of the charger, and measurement of the charging voltage is done via additional sensing lines. The charger shown in EP 0 796 946 A2 is likewise designed for a maximum charging voltage of 4.1 V to 4.2 V.

ADVANTAGES AND SUMMARY OF THE INVENTION

The charger according to the invention for charging at least one rechargeable energy storage unit, having a defined internal resistance and having a compensation circuit for compensating for a voltage drop caused by the internal resistance during the charging operation offers the advantage over the prior art that the compensation takes place only whenever a charging current in fact is also flowing. To that end, the compensation circuit has a current detector for detecting the charging current of the rechargeable energy storage unit as well as a voltage regulator for adapting the charging voltage to the detected charging current. Advantageously, a simple two-point measurement thus results, with which the aforementioned disadvantages of a four-point measurement can be avoided, so that pronounced shortening of the charging time is attainable. Because the compensation circuit includes a voltage divider disposed between the current detector and the voltage regulator, and the compensation for the internal resistance is effected via the dimensioning of the voltage divider, there is no longer any dependency on a shunt required for current detection and integrated with the supply line and/or the ground line. Moreover, any sensing lines for measurement can be dispensed with entirely. The charger of the invention is furthermore not bound either to a defined maximum charging voltage or to a maximum current limit for the compensation or to any specific technology of the rechargeable energy storage unit.

According to the invention, the voltage divider is connected on one side to a reference voltage and on the other to an output of the current regulator, and a center pickup of the voltage divider is connected to at least one input of the voltage regulator. In this way, the current detector influences the voltage regulator via the voltage divider in such a manner that as a function of the detected charging current, the reference voltage for the voltage regulator is varied. The increase in the charging voltage corresponds to the voltage drop caused by the internal resistance. In this respect, especially simple generation of the reference voltage is obtained by means of a Zener diode located at an auxiliary voltage.

In an alternative feature, a temperature sensor is provided for varying the reference voltage. It is thus possible to compensate for a temperature-caused increase in the internal resistance by means of a corresponding increase in the reference voltage.

A very economical and simple embodiment is advantageously obtained if the voltage regulator is embodied an operational amplifier, whose inverting input is connected to the center pickup of the voltage divider and whose noninverting input is connected to a center contact of a further voltage divider, and the further voltage divider is located between a positive pole of the rechargeable energy storage unit and an electrical ground and furnishes an actual signal of the voltage of the rechargeable energy storage unit.

The current detection is effected by means of a shunt that can be connected to the rechargeable energy storage unit. Advantageously, the shunt is connected on one side to a node point, at which both an electrical ground and a ground contact of the rechargeable energy storage unit are located, and is connected on the other side to the current detector. This shunt can also be used for the compensation, so that this task need not be taken on by an additional resistor in the charging current circuit.

The defined internal resistance includes at least the various resistances of the relevant conductor tracks of a printed circuit board, wiring that may be present, the contacts for making contact between the rechargeable energy storage unit and the charger, and/or a disconnection device for disconnecting the rechargeable energy storage unit from the charger, respectively. If in addition the ohmic resistance of the individual cells used in the rechargeable energy storage unit and of the corresponding contacts and the cabling is known, then the defined internal resistance can also include that resistance for the sake of compensation.

BRIEF DESCRIPTION OF THE DRAWINGS

The invention will be described below in form of examples in conjunction with FIGS. 1 and 2, and in the drawings, the same reference numerals indicate the same components with the same mode of operation. The drawing figures, their description, and the claims include numerous characteristics in combination. One skilled in the art will also consider these characteristics individually and put them together to make further useful combinations. In particular, one skilled in the art will also put the characteristics of different exemplary embodiments together to make further useful combinations.

In the drawings.

DESCRIPTION OF THE PREFERRED EMBODIMENTS

Figure 1:
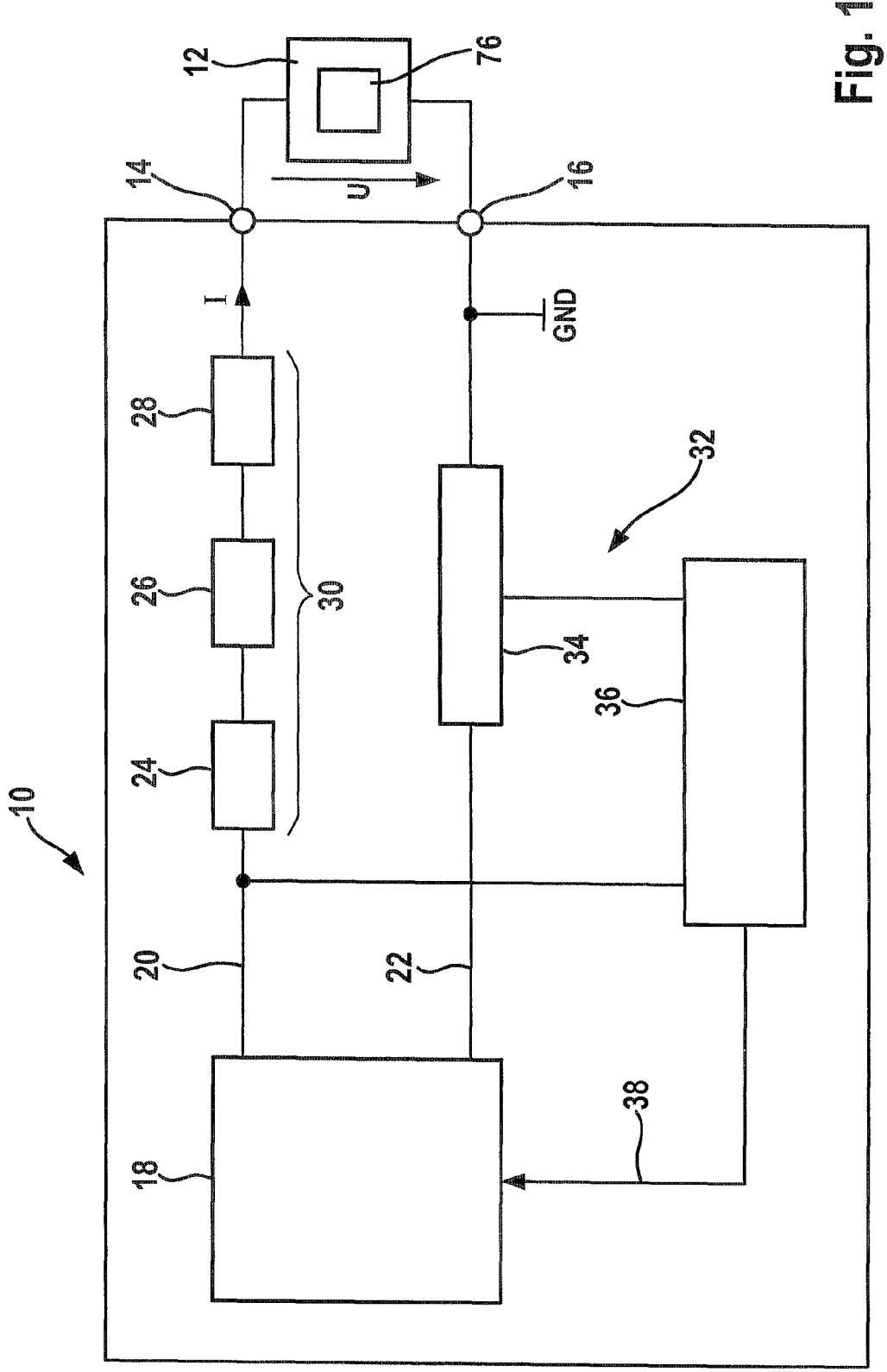
FIG. 1 shows a first block circuit diagram of the charger of the invention.

In FIG. 1, a first block circuit diagram is shown of a charger 10 of the invention, for charging a rechargeable energy storage unit 12 that is connected to the charger 10 via a first and a second contact 14 and 16, respectively. This connection may be made for instance by means of a plug contact, not shown in detail, which is known to one skilled in the art.

The charger 10 has a charging circuit 18, which among other elements includes an energy source, not shown, that can be connected to a power network and the electronics required for the charging operation of the rechargeable energy storage unit 12. Since the construction of the charging circuit 18 may vary for different types of energy storage units and for different requirements made of the charging operation, and is furthermore of subordinate importance to the invention, a detailed description will be dispensed with.

The two contacts 14 and 16 are connected to the charging circuit 18 via a power supply line 20 and a ground line 22 that is at an electrical ground GND. Reference numerals 24, 26 and 28, respectively, identify the resistances of the following: the conductor tracks, relevant to the charging operation, of a printed circuit board, not shown; a disconnection device for disconnecting the rechargeable energy storage unit 12 from the charger 10; and wiring, which may be present, that connects the contacts 14, 16 to the printed circuit board. A relay, semiconductor, or the like may be used in a known manner as the disconnection device. The resistances 24, 26 and 28 together form an internal resistance 30, which leads to a voltage drop dependent on the charging current I. This voltage drop on the one hand affects the fill level of the rechargeable energy storage unit 12, or in other words its maximum charging voltage, and on the other lengthens the charging operation.

To shorten the charging operation, according to the invention a compensation circuit 32 is provided in the charger 10; it includes a current detector 34 for detecting the charging current I of the rechargeable energy storage unit 12 and a voltage regulator 36 for adapting the charging voltage U to the detected charging current I. The voltage regulator 36 is connected on one side to the power supply line 20 and on the other to the current detector 34, and the current detector 34 is at least partially integrated with the ground line 22. Via a connecting line 38, the voltage regulator 36 has an influence on the charging circuit 18 such that the charging voltage U is increased as a function of the charging current I by the amount of the voltage drop generated by the internal resistance 30, thus shortening the charging time accordingly.

Figure 2:
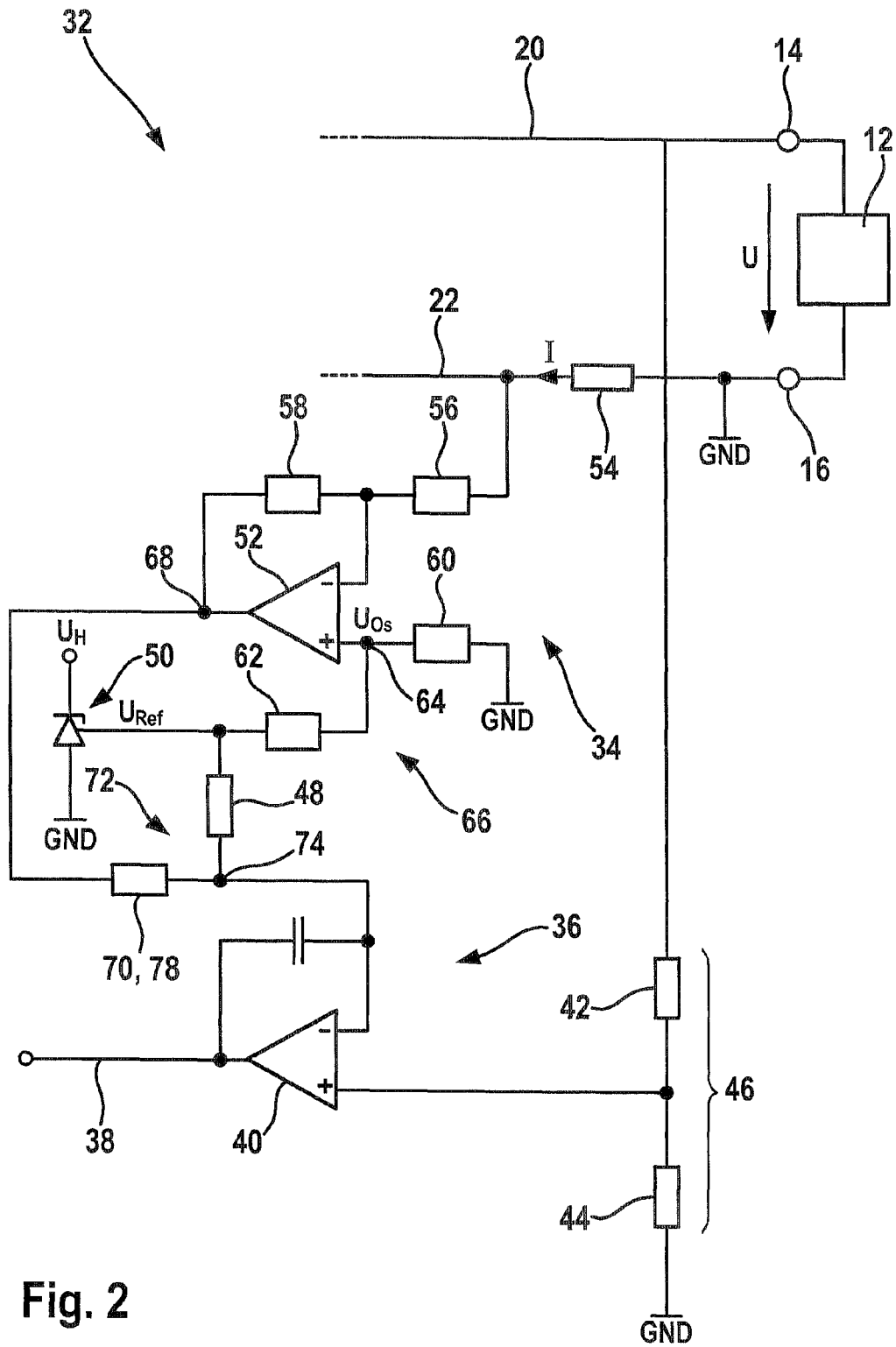
FIG. 2 shows a second, detailed block circuit diagram of the compensation circuit, according to the invention, of the charger.

FIG. 2 shows a detailed block circuit diagram of the compensation circuit 32 of the invention, which as in FIG. 1 comprises the current detector 34 and the voltage regulator 36. The voltage regulator 36 includes an operational amplifier 40, embodied as a current regulator, at the noninverting input of which an actual signal is present in the form of the charging voltage U, reduced by the corresponding resistance ratio by means of a voltage divider 46 that comprises the resistors 42 and 44. This charging voltage is picked up at the power supply line 20, by way of which the rechargeable energy storage unit 12 is charged by means of the first contact 14. The charging voltage U is the result of the difference in potential between the first contact 14 and the second contact 16 connected with via the ground line 22 and the electrical ground GND. Via a resistor 48, a reference voltage $U_{Ref}$ is supplied to the inverting inputs of the operational amplifier 40 and is generated by a Zener diode 50 located at an auxiliary voltage $U_H$. It is understood that instead of the Zener diode 50, other suitable components for generating a reference voltage, such as operational amplifiers or the like, may be employed.

The current detector 34 includes a further operational amplifier 52, wired as an inverting amplifier, to the inverting input of which the voltage drop, which is negative compared to the electrical ground GND, of a shunt 54 disposed in the ground line 22 is applied. This negative voltage drop is amplified by the amplification factor adjusted by means of resistors 56 and 58, and is added to an offset voltage $U_{Os}$ that is present at the noninverting input of the further operational amplifier 52. The offset voltage $U_{Os}$ results at a center pickup of a voltage divider 64, which is formed of resistors 60 and 62 and is connected on one side to the reference voltage $U_{Ref}$ and on the other to the electrical ground GND. The resistors 60 and 62 of the voltage divider 64 are dimensioned such that in the currentless case, a voltage at the level of the reference voltage $U_{Ref}$ results at the output 68 of the further operational amplifier 52.

The output signal of the further operational amplifier 52 is now fed via a resistor 70 to the voltage regulator 36, and the resistors 48 and 70 form a voltage divider 72, whose center pickup 74 is connected to the inverting input of the operational amplifier 40. As soon as a charging current I flows via the shunt 54, the voltage at the output of the further operational amplifier 52 is higher than the reference voltage $U_{Ref}$. In accordance with the divider ratio of the two resistors 48 and 70 of the voltage divider 72, the voltage at the inverting input of the operational amplifier 40 is higher than the reference voltage $U_{Ref}$. Conversely, if no charging current I is flowing, the voltage at the inverting input of the operational amplifier 40 is equivalent to the reference voltage $U_{Ref}$. The magnitude of the influence of the current detector 34 on the voltage regulator 36 is defined by the resistor 70 and depends on the magnitude of the internal resistance 30 (FIG. 1) that has to be compensated for. The current detector 34 moreover influences the voltage regulator 36 via the voltage divider 72 in such a way that, as a function of the charging current I detected, the reference voltage $U_{Ref}$ for the voltage regulator 36 and accordingly the charging voltage U as well are varied. To that end, with reference to FIG. 1, the output of the operational amplifier 40 is connected to the charging circuit 18 via the connecting line 38.

In an alternative feature, besides the internal resistance 30 of the charger 10, formed of the resistors 24, 26 and 28, the ohmic resistance 76 of the rechargeable energy storage unit 12 is taken into account as well. The ohmic resistance 76 is the result of the resistances of the individual cells used in the rechargeable energy storage unit 12 as well as of the corresponding contacts and the requisite connections. For compensation, it is necessary that the ohmic resistance 76 be known, so that the voltage divider 72 can be adapted to the resultant total internal resistance 30.

In a further alternative feature, it is provided that the reference voltage $U_{Ref}$ can be influenced by means of a temperature sensor. The resistor 70 can then be replaced by an NTC 78, for instance. Alternatively, still other components with a corresponding negative temperature coefficient may be used. The use of the NTC 78 is advantageous because the internal resistance 30 of the charger 10 also varies as a function of the temperature. It is thus possible for instance to compensate for a temperature-caused increase in the internal resistance 30 by means of a corresponding increase in the reference voltage $U_{Ref}$.

In conclusion, it should also be pointed out that the exemplary embodiments shown are limited neither to FIGS. 1 and 2 nor to the electrical components described. For instance, it is conceivable for the circuit shown to be realized either completely or in part in the form of an integrated circuit. Moreover, there is no need to give exact values for the resistances, because among other factors, they depend on the types of rechargeable energy storage units used and on the peripheral values of the charger 10 (maximum charging voltage U, maximum charging current I). One skilled in the art will be capable of selecting these values to suit the field of use.

In addition, both the charger 10 of the invention and its compensation circuit 32 offer the advantage that their use can be considered for arbitrary charging voltages and charging currents (the compensation functions for example with charging currents between 0.1 A and 100 A) and for the most various types of rechargeable energy storage units, such as lithium-ion, nickel-hydride, nickel-cadmium, lead, and so forth. The use for rechargeable energy storage units of electrical power tools would be conceivable, for instance, and the invention is not limited to that.

The foregoing relates to the preferred exemplary embodiments of the invention, it being understood that other variants and embodiments thereof are possible within the spirit and scope of the invention, the latter being defined by the appended claims.

The invention claimed is:

1. A charger for charging at least one rechargeable energy storage unit, having a defined internal resistance and having a compensation circuit for compensating for a voltage drop brought about by the internal resistance during a charging operation, in which the compensation circuit has a current detector which detects a charging current of the rechargeable energy storage unit and a voltage regulator for influencing the charging voltage as a function of a detected charging current, the compensation circuit including a voltage divider, which is disposed between the current detector and the voltage regulator and by way of the dimensioning of the voltage divided the compensation for the internal resistance is effected,
    wherein the voltage divider is connected on one side to a reference voltage and on another side to an output of the current detector, and a center pickup of the voltage divider is connected to at least one input of the voltage regulator,
    wherein the charger is not bound to either one of a (i) defined maximum charging voltage value and (ii) maximum current limit value for the compensation,
    wherein the compensation for the voltage drop occurs only when the charging current is flowing,
    wherein the voltage regulator has an operational amplifier, whose inverting input is connected to a center pickup of the voltage divider and whose noninverting input is connected to a center contact of a further voltage divider, and the further voltage divider is located between a power supply line of the rechargeable energy storage unit and an electrical ground and furnishes an actual signal of the charging voltage of the rechargeable energy storage unit.

2. The charger as defined by claim 1, wherein the current detector influences the voltage regulator via the voltage divider in such a manner that as a function of the detected charging current, the reference voltage for the voltage regulator is varied.

3. The charger as defined by claim 2, wherein the reference voltage is generated by means of a Zener diode located at an auxiliary voltage.

4. The charger as defined by claim 1, wherein the reference voltage is generated by means of a Zener diode located at an auxiliary voltage.

5. The charger as defined by claim 1, wherein a temperature sensor, in particular an NTC is provided for influencing the reference voltage.

6. The charger as defined by claim 2, wherein a temperature sensor, in particular an NTC is provided for influencing the reference voltage.

7. The charger as defined by claim 1, wherein current detection is effected by means of a shunt that can be connected to the rechargeable energy storage unit.

8. The charger as defined by claim 7, wherein the shunt is connected on one side thereof to a node point, at which both an electrical ground and a ground contact of the rechargeable energy storage unit are located, and is connected on an other side thereof to the current detector.

9. The charger as defined by claim 1, wherein the defined internal resistance includes at least various resistances of relevant conductor tracks of a printed circuit board, wiring, which may possibly be present, of the contacts for making contact between the rechargeable energy storage unit and the charger, and/or a disconnection device for disconnecting the rechargeable energy storage unit from the charger, respectively.

10. The charger as defined by claim 9, wherein the defined internal resistance includes ohmic resistance of the rechargeable energy storage unit.

* * * * *

UNITED STATES PATENT AND TRADEMARK OFFICE
CERTIFICATE OF CORRECTION

PATENT NO.       : 8,648,563 B2
APPLICATION NO.  : 12/741120
DATED            : February 11, 2014
INVENTOR(S)      : Alexander Osswald Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 339 days.

Signed and Sealed this

Twenty-ninth Day of September, 2015

Michelle K. Lee
*Director of the United States Patent and Trademark Office*